J. STROOP.
Seed Planter.
No. 6,562.
Patented June 26, 1849.
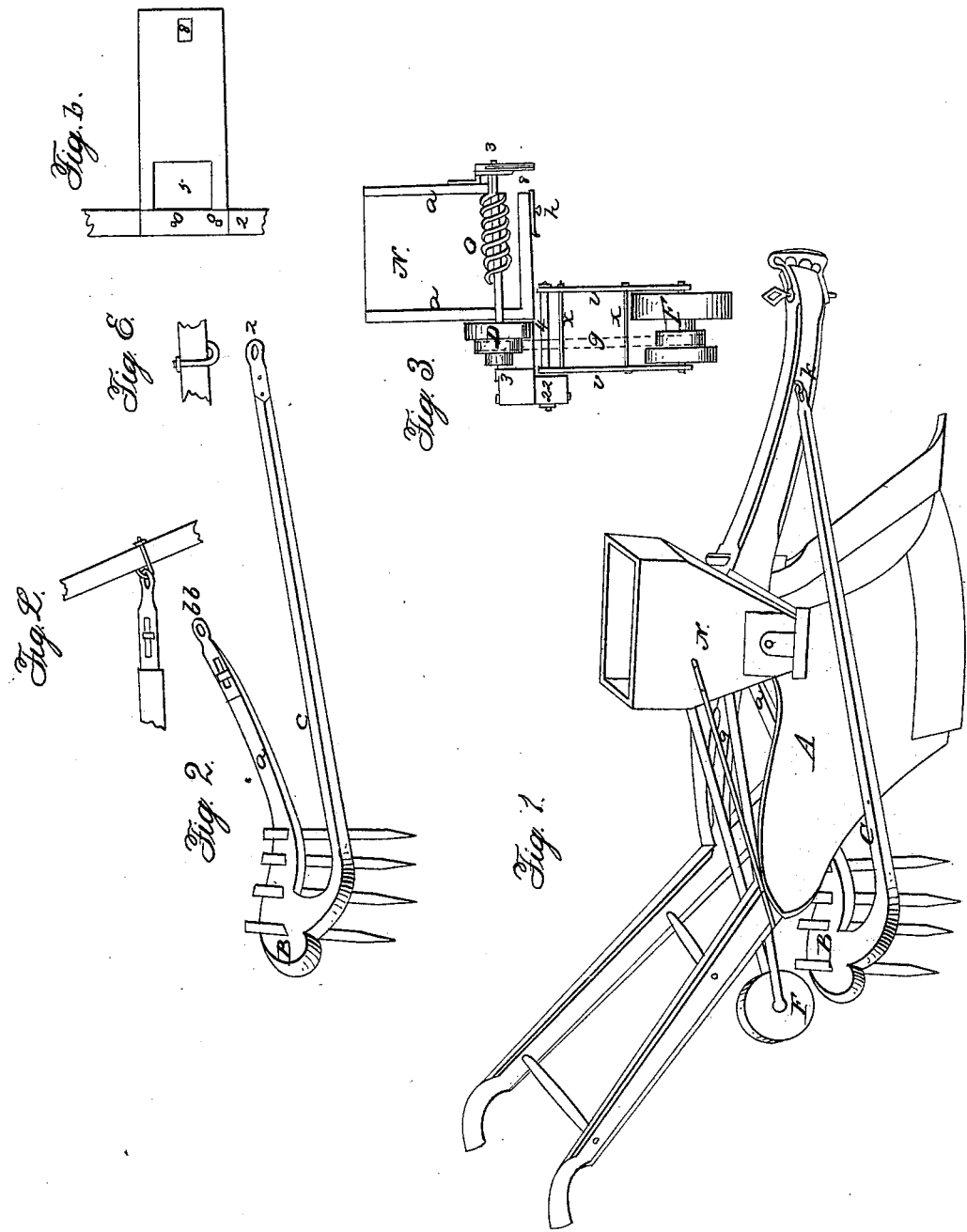

UNITED STATES PATENT OFFICE.

JACOB STROOP, OF PHILADELPHIA, PENNSYLVANIA.

IMPROVEMENT IN THE ATTACHMENT OF HARROWS TO PLOWS.

Specification forming part of Letters Patent No. 6,562, dated June 26, 1849.

*To all whom it may concern:*

Be it known that I, JACOB STROOP, of the city of Philadelphia, in the county of Philadelphia and State of Pennsylvania, have invented new and useful Improvements on the Combination of the Agriculture Plow and Harrow called the "American Combination Plow;" and I do hereby declare that the following is a full, clear, and exact description of the construction and operation of the same, reference being had to the annexed drawings, making a part of this specification, in which—

Figure 1 is a perspective view. A is the plow most common in use, on which I describe my improvements, and is applicable to others of similar construction.

Fig. 2 is the frame of the harrow. B is the head end of the beam, in which the teeth are set. *a* is the tail end of the beam, that lies back of the mold-board when in place. *b b* is a coupling-plate on the end of the beam, with a long or slide cut and set-screw to adjust the harrow to the plow. C is a shaft firmly connected to the head end of the beam, and is of such length as to extend forward to the fore end of the plow-beam toward the clevis. 2 is a plate on the end of the shaft C, having a hole or ring in the point to connect with a hook in the plow-beam. (See Fig. E.) The mode of attaching the harrow in this new way is by placing the harrow-beam back of the mold-board, extending the tail end as far forward as possible, and connecting it to the beam or sheth. (See Fig. L.) The shaft C, extending forward, is attached to the fore-end plow-beam or to the clevis.

I now explain the object and use of this new mode of constructing the harrow and manner and use of this new mode of attachment.

I use simply one piece to hold the harrow-teeth, and use not more than four teeth, which makes but little work and expense in its construction. The beam being placed close back of the mold-board places it entirely out of the way of the plowman's feet when attending to the management of the plow, and being attached to the nearest end of the beam or sheth, as near the fore end of the mold-board, which forms the pivot of the plow when in operation, removes all action on the rear end of the plow.

Thereby I avoid any jostling or action of the harrow that might operate against the steady running of the plow.

The shaft C is also a new mode of applying the power to the harrow which is necessary for its purpose. By this method of attachment the power is taken so near the fore end of the plow-beam that the power is there divided between the two implements, so that each receives a proportionable share without any interference with each other. Also, the mode of connection by the limber joints on the ends of the beam *a b b* and the shaft C leaves each implement to act free without either being an incumbent to the other, so that the management of the plow is left easy in the hands of the plowman, and makes a complete implement for the use of farmers in breaking up their lands, in stirring their fallow grounds, as also to aid the plow in covering in the seed and leveling and smoothing the ground.

Fig. 3 is the seed-machine. N is the grain or seed-box. *a a* are the ends. O is the feed-screw. The screw is similar to the auger. It lies in a horizontal position in the bottom of the seed-box and revolves on the journals of the shaft at 3 3. D is a pulley-head on the shaft, on which the strap *g* acts and gives motion to the screw. F is a roller that rolls in the furrow that gives motion to the screw-feeder. To the side of this roller is a pulley, attached similar to that of D. *v v* are arms to the frame, that connect the roller F to the plow. *x x* are stays between the arms *v v*. 2 2 is the plow-beam, on which is supported the seed-box. 4 is a bar set firm in the beam, on which the arms *v v* are placed and vibrate. 8 is the seed-hole, through which the seed drops to the ground. *h* is a slide-door to close or open the hole.

Fig. 6 is a view of the bottom board of the box; 2 2, the plow-beam; *o o*, the bolts that fasten the box on the beam. 5 is an opening for the pulley-head D to work in; 8, the drop-hole; 9, Fig. 1, a brace to support the out end of the box.

The operation: The gearing to plow is in the usual manner in which it is made to move, as also its operation in the ground. The motion or revolving of the screw casts out the seed.

The harrow, following in the rear of the moldboard and acting on the ridge, levels the soil and covers in the seed which has not been covered by the plow. The quantity of seed is to be regulated by the pulley-heads by changing the strap.

What I claim as my invention, and desire to secure by Letters Patent, is—

Attaching the harrow B to the plow in the manner herein described and represented—that is to say, attaching the long arm C, at $k$, anterior to the colter, and the short arm $a$ in the rear of the sheth, in the manner and for the purpose set forth.

JACOB STROOP.

Witnesses:
I. S. SMITH,
T. H. HILL.